United States Patent Office 3,290,514
Patented Dec. 6, 1966

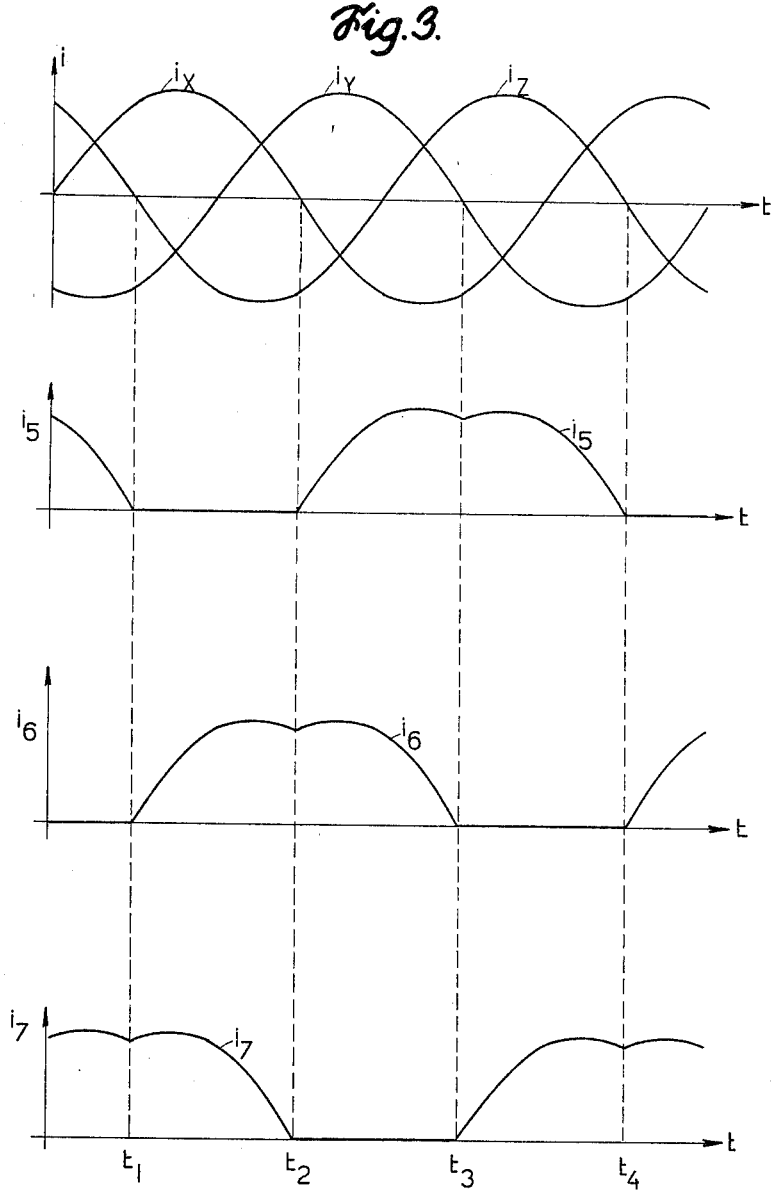

3,290,514
CONTACTLESS ALTERNATING CURRENT
SWITCH WITH CONTROLLED RECTI-
FIERS OF THE ELECTRONIC TYPE
Jiri S. Haskovec and Adolf Klimek, Prague, Czechoslovakia, assignors to Československá akademie věel, Prague, Czechoslovakia
Filed Apr. 25, 1963, Ser. No. 275,734
Claims priority, application Czechoslovakia,
Apr. 27, 1962, 2,581/62
5 Claims. (Cl. 307—88.5)

This invention relates to improvements in control circuits for static alternating current switches wherein controlled rectifiers are employed as the switching devices.

Known circuit arrangements exist in which controlled rectifiers are employed in alternating current networks or circuits as switches or variable inductances. Oppositely oriented pairs of parallel connected controlled rectifiers are used for these purposes, one of such pairs being employed for each phase to be switchedly controlled. Each rectifier requires its own associated control circuit, each of the control circuits having to be isolated from each other by complicated connection arrangements.

The static switch type circuit has become increasingly important, particularly since the introduction of the pnpn type semiconductor rectifier, as the efficiency of operation of such rectifiers is quite good in that their dimensions are quite small and their power consumption is low.

An object of this invention is to provide simple and reliable control circuits for controlled rectifiers such as thyratrons and ignitrons but particularly for semiconductor controlled rectifiers.

An important object of the invention is to provide a static alternating current switch employing controlled rectifiers, particularly of the semiconductor type.

An important feature of the switch according to the invention resides in the fact that the controlled rectifiers are connected in a closed circuit in an arrangement whereby the anode of one rectifier is always connected to the cathode of the succeeding adjacent rectifier. Furthermore, the control electrode of at least one rectifier is connected to a current transformer which couples the control circuit of such rectifier with the operating circuit of the adjacent preceding rectifier, the latter coupling being effected such that a current is induced in the control circuit of the next succeeding adjacent rectifier in the region of the passage of the operating current of the preceding rectifier through the zero point, such induced current rendering the succeeding rectifier conductive. In addition, at least one rectifier is connected to an external circuit.

The above mentioned and other objects and features of the invention will be best understood from the following specification to be read in conjunction with the accompanying drawing, in which:

FIG. 3 shows the wave shape of the currents in the circuit arrangement according to FIG. 2.

Figure 1:
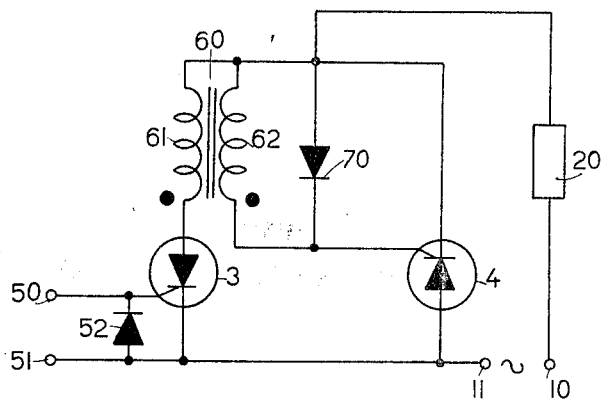
FIG. 1 shows a known circuit arrangement of a control switch in accordance with the invention for single-phase alternating current using controlled semiconductor rectifiers of the pnpn type.

Referring now more particularly to FIG. 1, the numerals 10 and 11 denote the alternating voltage supply terminals from the source. Between these terminals and in series with the power consuming device or appliance 30 there is arranged an antiparallel circuit of two controlled valves 3 and 4 of the pnpn type. The rectifier 3 is directly controlled by the control direct voltage from the terminals 50, 51 between which there is arranged a protective diode 52. In series with this rectifier 3, and in the anode circuit thereof, there is arranged the primary winding 61 of a transformer 60 whose secondary winding 62 is bridged by a protective diode 70. The diode 70 being connected between the cathode and the control electrode of the second indirectly controlled rectifier 4. In the case illustrated, both rectifiers are opened by a positive voltage on their control electrode. The transformer 60 is connected such that if the current in the circuit of the rectifier 3 drops to zero, an ignition voltage is induced in the secondary winding with positive polarity on the control electrode of the rectifier 4.

The above circuit functions in the following manner:

As long as there is no positive voltage on the control electrodes of the rectifiers 3 and 4, both rectifiers are nonconductive, and the operating circuit of the power consuming device 20 and of the source connected between the terminals 10 and 11 is interrupted. The protective diode 52 which shortcircuits the control circuit protects against the overloading of the appropriate junction of the valve 3 by a control voltage of negative polarity. If the polarity of the control voltage on the control electrode 3 is positive, the protective diode 52 is closed and the rectifier 3 becomes conductive for current flowing from the anode to the cathode. As long as this current increases, the transformer 60 induces on the control electrode of the rectifier 4 a negative voltage which is short-circuited by the second protective diode 70 and the rectifier 4 remains closed. If the value of the current in the primary winding of the transformer 60 drops, a positive voltage is induced on the control electrode of the rectifier 4. The maximum of this positive voltage occurs at the moment when the current through the rectifier 3 is interrupted as the current passes through the zero point. This opens rectifier 4 which now conducts the second half-wave of the alternating current from the terminals 10, 11 into the power consuming device 20. The rectifier 4 is closed as the current passes through zero point. This process is repeated if a positive voltage is again on the control electrode of the rectifier 3. The switch is thereby closed.

Figure 2:
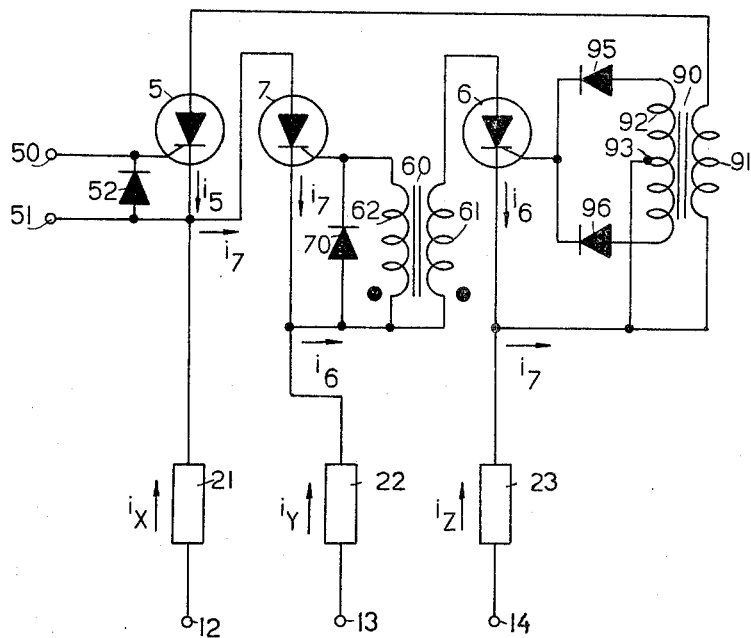
FIG. 2 is the circuit arrangement according to the invention for three-phase current.

FIG. 2 is a depiction of an arrangement according to the invention, which in part takes advantage of the above described arrangement for polyphase circuits in a three-phase circuit with a three-phase load 21, 22, 23. One pole of each of the phase loads 21, 22 and 23 is respectively connected to the main terminals 12, 13, 14, the other poles of the phase loads are connected to the neutral point switch formed by the rectifiers 5, 6 and 7, the rectifiers 5, 6 and 7 being respectively connected in series with loads 21, 22 and 23. The rectifier 5 is controlled directly by the control voltage from the terminals 50, 51. The control electrode of the rectifier 6 is connected through two protectively polarized diodes 95, 96 with both ends of the secondary winding 92 of the transformer 90. The central point 93 of this winding 92 is connected to the cathode of the rectifier 6. This different connection is necessary because two valves have to be open at the same time as follows from the description of the function of the circuit arrangement. The primary winding 91 of the transformer 90 is connected in the anode circuit of the preceding rectifier 5. The connection of the transformer 60 and of the control circuit of the rectifier 7 is the same as the connection of the transformer 60 and of the control circuit of the rectifier 4 in FIG. 1.

The circuit arrangement in accordance with the invention is very simple. The device functions in the following manner:

In the operated condition of the rectifiers 5, 6 and 7, currents $i_x$, $i_y$, $i_z$ flow through the individual phase loads 21, 22 and 23. These currents branch off into the various rectifiers as currents $i_5$, $i_6$ and $i_7$, as shown in FIG. 2.

Between the currents $i_x$, $i_y$ and $i_z$ of the loads 21, 22 and 23 and the currents $i_5$, $i_6$ and $i_7$ of the rectifiers, there is:

$$i_x = i_7 - i_5$$
$$i_y = i_6 - i_7$$
$$i_z = i_5 - i_6$$

None of the currents $i_5$, $i_6$ and $i_7$ can be negative because the rectifiers 5, 6, 7 conduct only in the forward or low-resistance direction. Due to the fact that voltage drops develop across the rectifiers 5, 6 and 7 in the forward direction, all rectifiers cannot conduct current simultaneously. Only two rectifiers always conduct at one time, i.e., generally for an $n$-phase system, $n-1$ rectifiers are simultaneously conductive.

By comparing these three conditions it is possible to determine the time sections of the cycle in which the various rectifiers are conductive. For example in the time section in which $i_x > 0$ and $i_z < 0$, there is $i_5 = 0$, $i_7 = i_x$, and $i_6 = -i_z$; in the time section in which $i_y > 0$ and $i_x < 0$, there is $i_7 = 0$, $i_6 = i_y$ and $i_5 = -i_x$; and in the remaining time section in which $i_z > 0$ and $i_y < 0$, there is $i_6 = 0$, $i_5 = i_z$, and $i_7 = -i_y \oplus$.

The wave shapes of the currents corresponding to the above conditions are illustrated in FIG. 3. They show that the rectifier 6 is ignited at the moment $t_1$ at which point the rectifier 5 is extinguished. This is ensured by the transformer 90. As the current $i_5$ passes through zero point in one-half of the secondary winding of this transformer there is induced a current which is fed to the control electrode of the rectifier 6. Similarly, the rectifier 7 ignites at the moment $t_3$, where the rectifier 6 is extinguished, by means of the transformer 60. The rectifier 5 ignites independently from an external current source which is fed to its control electrode. The switch is closed or operated.

If the rectifier 5 is not ignited by an external control current, the current $i_5 = 0$; consequently, no ignition impulse is produced in the transformer 90 and the current $i_6 = 0$. Therefore, rectifier 7 does not ignite, either, and the current through the load is zero. The switch is open or inoperative.

The second half of the secondary winding 92 of the transformer 90 serves for igniting the rectifier 6 on occurrence of the first ignition of the rectifier 5 when both rectifiers 7 and 6 do not yet conduct current. As can be seen from FIG. 3, the rectifier 5 has to be ignited at the moment $t_2$, to render rectifier 6 also conductive. This rectifier is therefore ignited by a current impulse created in the second half of the secondary winding as the current $i_5$ increases after ignition of the rectifier 5.

Polyphase circuit arrangements and their modifications can be readily derived in accordance with the above explanations, i.e., the requirement for an $n$-phase system of $n-2$ transformers with two secondary windings and one transformer with a single secondary winding.

What we claim is:

1. A static alternating current switch for controlling the neutral point of an $n$ poly-phase load comprising first to $n$th controlled rectifiers, each of said rectifiers comprising an anode, a cathode, and a control electrode, a first transformer comprising a first primary and a first secondary winding, said first primary winding being connected between the anode of said first of said rectifiers and the cathode of a third of said rectifiers, first and second forward poled diodes, the terminals of said first secondary winding being connected through said first and second diodes to the control electrode of said third rectifier, a second transformer comprising a second primary and a second secondary winding, said second primary winding being connected between the anode of said third rectifier and the cathode of a second of said rectifiers, said second secondary winding being in circuit with the control electrode of said second rectifier, the anode of said second rectifier being connected to the cathode of said first rectifier, a unidirectional potential source in circuit with the control electrode of said first rectifier, the cathodes of said first, second and third rectifiers being connected to first, second and third phases of said load.

2. A static alternating current switch as defined in claim 1 wherein said controlled rectifiers are of the gate controlled semiconductor type.

3. A static alternating current switch as defined in claim 2 and further including a third diode connected in its cathode to anode path between the control electrode and cathode of said first controlled rectifier.

4. A static alternating current switch as defined in claim 3 and further including a fourth diode connected in its cathode to anode path between the control electrode and cathode of said second controlled rectifier.

5. A static alternating current switch as defined in claim 2 wherein the mid-point of said first secondary winding is connected to the cathode of said third controlled rectifier.

References Cited by the Examiner

UNITED STATES PATENTS 3,058,010 10/1962 Rackafellow _____ 307—88.5
3,176,150 3/1965 McMurray _____ 307—88.5

OTHER REFERENCES

G.E. Silicon Controlled Rectifier Manual, 2d edition, copyright Dec. 29, 1961, p. 36 relied on.

ARTHUR GAUSS, *Primary Examiner.*

R. H. EPSTEIN, *Assistant Examiner.*